Figure 1:
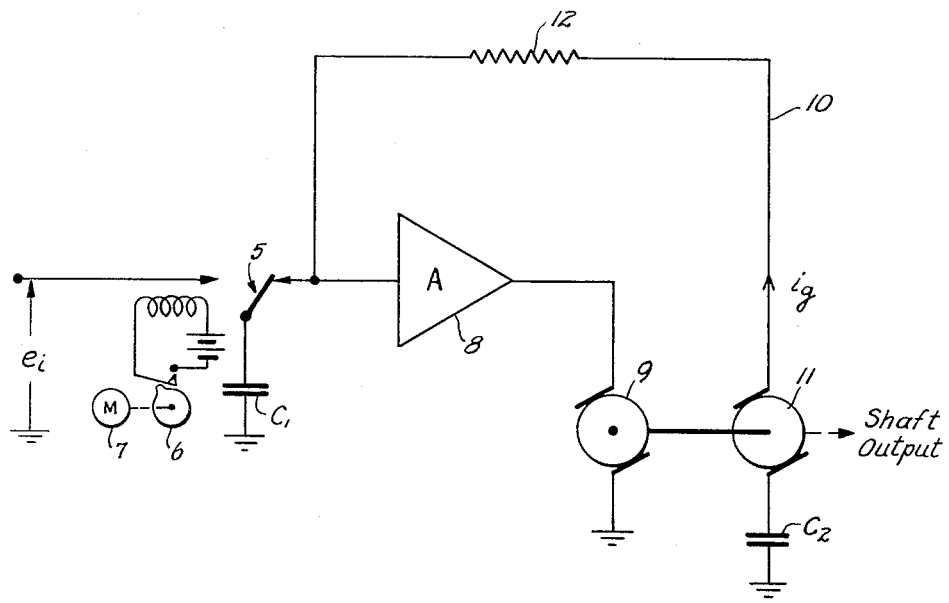

July 12, 1955  F S. MACKLEM  2,713,135
INTERPOLATION SERVO
Filed March 9, 1951

Inventor
F. SUTHERLAND MACKLEM
By Mitchell & Bechert
Attorneys

United States Patent Office 2,713,135
Patented July 12, 1955

2,713,135

INTERPOLATION SERVO

F. Sutherland Macklem, Freeport, N. Y., assignor to Servo Corporation of America, New Hyde Park, N. Y., a corporation of New York Application March 9, 1951, Serial No. 214,697

11 Claims. (Cl. 318—28)

My invention relates to an improved servomechanism, which may accept an electrical input and produce a corresponding physical-displacement output.

It is an object of the invention to provide an improved device of the character indicated.

It is another object of the invention to provide an improved servomechanism, wherein the output may reflect changes not only in the magnitude of a given signal, based on an error-signal input, but also in the rate of change of the given signal, based on the same error-signal input.

It is a further object to provide an improved servomechanism wherein position and rate-of-change-of-position outputs may be available from input signals representing periodic sampling of a given electrical signal.

It is still another object to provide an improved servomechanism which may periodically sample a given electrical signal, and which may not only produce substantially instantaneous displacement changes in accordance with changes in the sampled signal, but which may also interpolate or predict position based on the rate of change in the sampled signals.

It is also an object to provide a servomechanism which may perform the above functions based on a periodic sampling of input signals.

Figure 2:
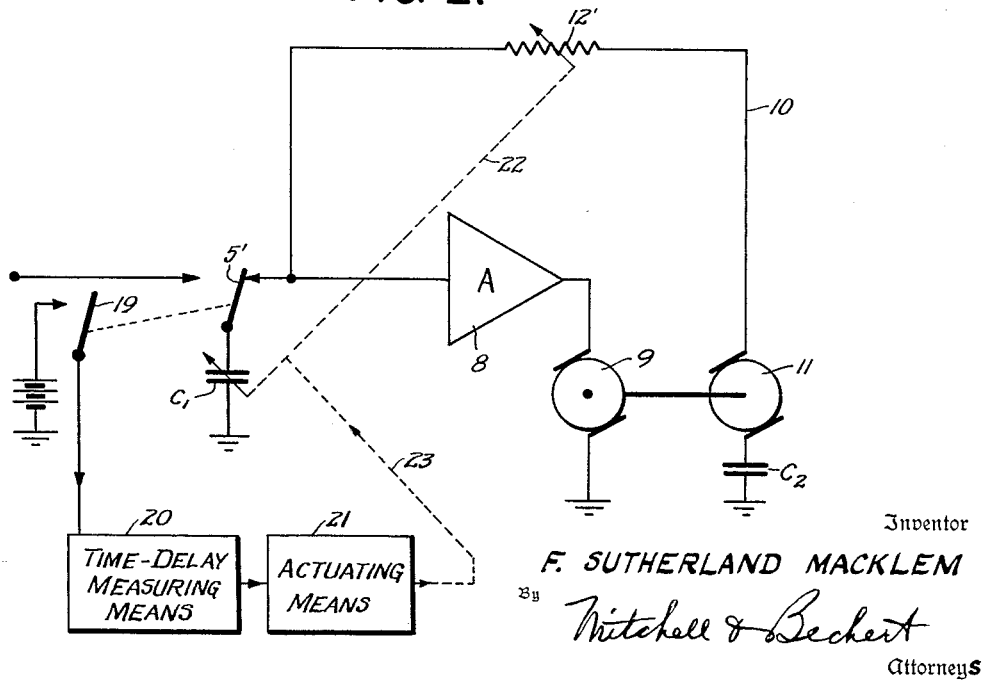

Other objects and various further features of the invention will be pointed out or will occur to those skilled in the art from a reading of the following specification in conjunction with the accompanying drawings. In the drawings, which show, for illustrative purposes only, preferred forms of the invention:

Fig. 1 schematically shows an electro-mechanical circuit embodying features of the invention; and Fig. 2 schematically shows a modified circuit embodying features of the circuit of Fig. 1.

Briefly stated, my invention contemplates a servomechanism employing a high-gain amplifier and two high-capacity low-leakage capacitances, in the input and output circuits, respectively, of the amplifier. Means are provided for placing a charge representing a sampled electrical input upon one of these capacitances, and the amplifier includes a feed-back circuit, whereby the amplifier may only be driven by an amount necessary to produce an output which will substantially discharge the input capacitance. At the same time, the output of the amplifier includes means for charging the second capacitance, in accordance with the total displacement effected upon discharging the first capacitance; this second charge is available for further driving the amplifier during the interval between samplings, in accordance with the rate of change of signals applied to the first capacitance. The output of the circuit may be a physical displacement represented by rotation of a motor-generator shaft, the motor of which is connected to be driven by the amplifier, and the output of which is connected to charge the second capacitance and to discharge the first capacitance. In the first form to be described, sampling is made at regular periodic intervals; in the second form, sampling is aperiodic.

Referring to Fig. 1 of the drawings, my invention is shown in application to a servomechanism designed to track a signal $e_1$ varying continuously in time, and in which the only information available is the instantaneous position or magnitude of the signal at discrete instants.

(The signal $e_1$ may be a so-called error or deviation signal representing the instantaneous difference between the magnitude of a given variable quantity and the magnitude of a corresponding quantity characterizing operation of a deviation-responsive device.) This information may be in the form of a D.-C. signal and may be transferred via a sampling relay 5 to a first capacitance $C_1$ having high-capacity low-leakage characteristics. The relay 5 may be operated in a regular period, as determined by a cam switch 6 driven by a motor 7; in the preferred form, the connection of relay 5 to amplifier 8 is maintained substantially all the time, the period of sampling-connection to the input signal $e_1$ being preferably for only relatively short periods of time. The amplifier 8 is preferably characterized by high gain and by a high-impedance input, and its output may be connected to the motor 9 of a motor-generator (9—11). Feed-back means 10 including a resistor 12 may connect the output of generator 11 to the input of amplifier 8. The second capacitance $C_2$ may be included in the output circuit of the generator 11, and this second capacitance also preferably has high-capacity low-leakage characteristics.

In operation, the input signal $e_1$ will be regularly sampled when cam switch 6 determines a sampling operation of relay 5. The charge then placed upon capacitance $C_1$ will reflect the magnitude of this input signal at the instant of sampling, and will be available for driving the amplifier 8. Now, the amplifier 8 is preferably so designed and arranged that sampled voltages appearing across capacitance $C_1$ will drive amplifier 8 at saturation, and so that, as long as the amplifier is run at saturation, the motor 9 will be driven at full speed. The extent of drive (i. e. displacement) of motor-generator means 9—11 will depend upon the exact sample charge on capacitance $C_1$ because the amplifier will be driven until the feed-back current $i_g$ effectively or substantially discharges capacitance $C_1$. Thus, the shaft output of the motor-generator means 9—11 may relatively quickly and almost instantaneously reflect a position correction ($\theta$ degrees) proportional to the sampled charge on capacitance $C_1$.

Now, in the process of substantially instantaneously driving the motor-generator means 9—11, a corresponding charge is developed across capacitance $C_2$. This charge on capacitor $C_2$ will be corrected as the motor-generator 9—11 is displaced upon each voltage sampling, so that at any given time the charge on capacitor $C_2$ will reflect the most recently sampled input voltage. Thus, the capacitor $C_2$ will tend to remain charged at the particular level determined by the most recent sampling, and the instananeous charge level (on capacitor $C_2$) will determine an equilibrium point for the above-mentioned substantial discharging of capacitor $C_1$. Upon substantial discharge of capacitor $C_1$, equilibrium will be reached when the voltage across capacitor $C_1$ substantially equals the voltage across capacitor $C_2$, divided by the overall gain in the amplifier-motor-generator 8—9—11. The then-substantially-reduced voltage across capacitor $C_1$ will be understood to be within the linear range of amplifier 8, and this reduced voltage will be available for a further slow drive of motor 9. Thus, for substantially the full extent of a given sampling period (i. e. between high-speed correcting displacements of motor generator means 9—11), motor 9 will be driven at a relatively slow speed reflecting the integrated charge on capacitor $C_2$.

The above discussion may perhaps be better understood from a brief reference to mathematical symbolism. During the relatively short periods of high-speed rotation of motor-generator means 9—11, the output current $i_g$ of the generator 11 will be proportional to the rate at which the motor-generator means 9—11 is driven; in other words, $$i_g = k\frac{d\theta}{dt}$$

As indicated, this current $i_g$ will be generated until capacitor $C_1$ is effectively discharged, so that—

$$e_{C_1} = \int i_g \cdot dt = k\int \frac{d\theta}{dt}\cdot dt = k\theta$$

Thus, it is clear that the actual rotary displacement of the generator shaft (when driven at full speed) will directly reflect the charge on capacitor $C_1$ and, therefore, the magnitude of the sampled signal.

Now, during each period in which capacitor $C_1$ is being discharged, the capacitor $C_2$ will be charged, so as to reflect a time-integration of such charges; after $n$ samplings, this may be symbolized as follows:

$$e_{C_2} = k^1(\theta_1 + \theta_2 + \theta_3 + \ldots \theta_n)$$

The voltage on capacitor $C_2$ is therefore proportional to the (long-term) rate of change of shaft rotation, and, as indicated above, it determines the angular velocity of the motor-generator shaft during periods between samplings. Thus, during periods between position or displacement correction, the motor shaft will be driven at a rate proportional to the relatively long-term rate of change of the sampled signal voltage.

In Fig. 2, I show my interpolation or position-velocity servomechanism in an application in which the error-signal input may not be sampled at regularly recurrent periods, the samplings being aperiodic. In Fig. 2, however, I do provide time-delay measuring means 20 responsive to the most recent interval between input-signal samplings, and such measuring means may, through suitable actuating means 21 provide appropriate corrective settings for certain circuit constants so that, in spite of irregular sampling periods, the output (shaft of motor 11) may properly reflect position and rate of change of position, as in the case of the Fig. 1 arrangement. The time-delay measurement may respond to pulses generated upon momentary closure of a further circuit through a second sampling-relay arm 19, ganged to function whenever the sampling relay 5' momentarily samples the input signal. Timing devices of the character contemplated at 20 are commercially available, and a suitable device is labeled "Clutch Unit Motor" on page 272 of the June 1954, issue of Electronics Buyer's Guide.

In order that the mechanism of Fig. 2 may always yield correct output "position" displacements, the product $RC_1$ must be held to a substantially constant value, where R is the resistance of the feedback resistor 12'. Further, in order that the mechanism may always yield correct output "velocity" displacements, the ratio $C_1:C_2$ must be held to a value substantially inversely proportional to the most-recently-determined input-sampling period. Various possibilities suggest themselves for effecting these results, and in the form shown, I choose not to vary $C_2$, but rather to couple capacitor $C_1$ and resistor 12 mechanically at 22 (so as to hold the product $RC_1$ constant) and to displace the coupling 22 (by means of actuator 21) by amounts inversely proportional to the detected sampling period, as indicated schematically at 23.

Thus, it will be seen that I have provided servomechanisms in which, with a single circuit, I obtain both corrected position and corrected velocity in the rotation of an output shaft. My mechanism may be automatically self-correcting upon each sampling, whether the samplings be at periodic or aperiodic intervals; position corrections are made with substantially immediate accuracy, and with a suitable choice of time constants, the delay needed for accurate velocity correction may be reduced to one or two sampling periods.

While the invention has been described in considerable detail in connection with the preferred forms shown, it will be understood that changes may be made within the scope of the invention as defined in the appended claims.

I claim:

1. In a servomechanism of the character indicated, amplifier means including an input and an output, a first capacitance connected to said input, motor-generator means connected to be driven by said output, sampling means including means for intermittently impressing a charge on said capacitance, feed-back means connecting the output of said motor-generator means to said input in such a way as substantially to discharge said capacitance, within the minimum period between samplings, whereby said motor-generator means may be physically displaced in accordance with the charge impressed on said capacitance, and a second capacitance in the output of said motor-generator means, whereby said second capacitance may be charged in accordance with the output of said motor-generator means so that after initial substantial discharge of said first capacitance, said second capacitance may through said feed-back means and said amplifier means drive said motor-generator means in accordance with the said rate of change of charges impressed on said first capacitance.

2. In a servomechanism of the character indicated, amplifier means including an input and an output, a first capacitance to be impressed with a charge, sampling means including means for periodically connecting said capacitance to said input, motor-generator means connected to be driven by the output of said amplifier means, a feed-back connection between the output of said motor-generator means and the input of said amplifier means, whereby motor-generator output may discharge said capacitance, said input-capacitance connection being maintained until substantial discharge of said capacitance, a second capacitance in the output of said motor-generator means, whereby said second capacitance may be charged in accordance with thte extent to which said motor-generator means is run by a sampled charge, and means for connecting said second capacitance to drive said amplifier means.

3. In a servomechanism of the character indicated, amplifier means including an input and an output, a high-capacity low-leakage capacitance in said input circuit, sampling means including means for intermittently impressing a charge on said capacitance, a high-capacity low-leakage capacitance in the output of said amplifier means, whereby said amplifier means may be driven in accordance with a charge on said first-mentioned capacitance, and so that said second-mentioned capacitance may be charged in accordance with the extent to which said amplifier means is thereby driven, feed-back means connecting the output of said amplifier means to the input thereof, whereby said amplifier means may be thereafter driven in accordance with the charge on said second-mentioned capacitance.

4. A servomechanism according to claim 3, in which the output of said amplifier means includes motor-generator means, said feed-back connection and said second-mentioned capacitance being connected in the output of said motor-generator means, whereby shaft rotation in said motor-generator means may relatively quickly reflect the most-recently-impressed charge on said first-mentioned capacitance, and whereby thereafter the relatively slow speed with said motor-generator means is driven may reflect the rate of change of charges impressed on said first-mentioned capacitance.

5. In a servomechanism of the character indicated, a high-gain amplifier including an output and a high-impedance input, a first high-capacity low-leakage capacitance, intermittently operative sampling means for charging said capacitance and connecting the same to said input, motor-generator means in the ouput of said amplifier, a second high-capacity low-leakage capacitance in the output of said motor-generator means, and feedback means including a leakage resistance connecting the output of said motor-generator means to the input of said amplifier means.

6. A servomechanism according to claim 5, in which said sampling means charges said first-mentioned capacitance when the latter is disconnected from said input.

7. In a servomechanism of the character indicated, high-gain amplifier means, motor-generator means connected in the output of said amplifier means, a high-capacity low-leakage capacitance in the output of said motor-generator means, whereby said capacitance may be charged in accordance with rapid or substantially instantaneous position changes of said motor-generator means, feed-back means including a resistance connecting said capacitance to the input of said amplifier means, a second capacitance, and sampling means including means for intermittently connecting said second capacitance to the input of said amplifier means, whereby said motor-generator means may be rapidly driven for the period immediately following connection of said second capacitance to said amplifier means until substantial discharge of said second capacitance through said feedback means, and further whereby the current developed upon driving said motor-generator means may discharge said second capacitance while charging said first capacitance so that in intervals between connections of said second capacitance to said input, said motor-generator means may be relatively slowly driven substantially in accordance with the rate of change of charge represented by the incremental charge placed on said first capacitance divided by the period between connections of said second-mentioned capacitance to said input.

8. In a servomechanism of the character indicated, a first capacitance, a high-gain amplifier, motor-generator means connected for control by the output of said amplifier, a second capacitance in the generator ouput of said motor-generator means, a feedback connection between said generator output and the amplifier input, input-sampling means including means for intermittently charging said first capacitance at intervals and for connecting said first capacitance to the amplifier input, one of said capacitances being variable, and actuating means responsive to the most-recent period between samplings and connected in controlling relation with said variable capacitance.

9. A servomechanism according to claim 8, in which the connected relation between said variable capacitance and said actuating means is such that the relation of said first-capacitance to said second capacitance varies inversely as the period between samplings.

10. In a servomechanism of the character indicated, a first capacitance, a high-gain amplifier, motor-generator means connected for control by the output of said amplifier, a second capacitance in the generator output of said motor-generator means, a feedback connection including a variable resistance between said generator output and the amplifier input, input-sampling means including means for charging said first capacitance at intervals and for connecting said first capacitance to the amplifier input, one of said capacitances being variable, and actuating means responsive to the most-recent period between samplings and connected in controlling relation with said variable capacitance and with said variable resistance.

11. A servomechanism according to claim 10, in which the connected relation between said first capacitance and said variable resistance and said actuating means is such that the product of the capacitance and the resistance is a constant.

References Cited in the file of this patent

UNITED STATES PATENTS

| | | |
|---|---|---|
| 2,513,537 | Williams | July 4, 1950 |
| 2,564,439 | Marrison | Aug. 14, 1951 |
| 2,593,950 | Williams, Jr. | Apr. 22, 1952 |
| 2,622,231 | Gray | Dec. 16, 1952 |

FOREIGN PATENTS

| | | |
|---|---|---|
| 66,087 | Denmark | Dec. 22, 1947 |